(12) United States Patent
Marcus et al.

(10) Patent No.: US 8,714,621 B2
(45) Date of Patent: May 6, 2014

(54) VISOR WITH MOVABLE PIVOT

(71) Applicant: Marcus Automotive, LLC, Holland, MI (US)

(72) Inventors: Konrad H. Marcus, Holland, MI (US); Edward T. Boerema, Montague, MI (US)

(73) Assignee: Marcus Automotive, LLC, Holland, MI (US)

( * ) Notice: Subject to any disclaimer, the term of this patent is extended or adjusted under 35 U.S.C. 154(b) by 0 days.

(21) Appl. No.: 13/722,307

(22) Filed: Dec. 20, 2012

(65) Prior Publication Data

US 2013/0161972 A1    Jun. 27, 2013

Related U.S. Application Data

(60) Provisional application No. 61/578,328, filed on Dec. 21, 2011.

(51) Int. Cl.
*B60J 3/02* (2006.01)

(52) U.S. Cl.
USPC ...................................... 296/97.11

(58) Field of Classification Search
USPC ...................... 296/97.1, 97.4, 97.8–97.13
See application file for complete search history.

(56) References Cited

U.S. PATENT DOCUMENTS

| | | | | |
|---|---|---|---|---|
| 4,674,789 A | * | 6/1987 | Watjer et al. | 296/97.1 |
| 4,989,910 A | * | 2/1991 | Mersman et al. | 296/97.4 |
| 5,031,952 A | * | 7/1991 | Miyamoto et al. | 296/97.4 |
| 5,328,227 A | * | 7/1994 | Pax et al. | 296/97.8 |
| 5,833,299 A | * | 11/1998 | Corn | 296/97.11 |
| 6,409,246 B1 | * | 6/2002 | Rennie | 296/97.6 |
| 6,682,122 B1 | * | 1/2004 | Prokhorov | 296/97.8 |
| 6,981,733 B1 | * | 1/2006 | Driscoll | 296/97.6 |
| 7,077,454 B1 | * | 7/2006 | Schambre | 296/97.8 |
| 7,090,281 B2 | * | 8/2006 | Davey et al. | 296/97.11 |
| 7,111,890 B2 | * | 9/2006 | Delus et al. | 296/97.9 |
| 7,140,664 B2 | * | 11/2006 | Asai | 296/97.8 |
| 7,275,778 B2 | * | 10/2007 | Asai | 296/97.11 |
| 7,347,480 B2 | * | 3/2008 | Lee | 296/97.4 |
| 7,802,836 B2 | * | 9/2010 | Baudouin | 296/97.1 |
| 7,854,464 B2 | * | 12/2010 | Mori | 296/97.4 |
| 8,038,199 B2 | * | 10/2011 | Marcus et al. | 296/97.9 |
| 2004/0056504 A1 | * | 3/2004 | Hattass et al. | 296/97.1 |
| 2004/0155489 A1 | * | 8/2004 | Kawasaki | 296/214 |
| 2005/0236864 A1 | * | 10/2005 | Asai | 296/97.8 |
| 2005/0285427 A1 | * | 12/2005 | Asai | 296/97.11 |
| 2009/0134656 A1 | * | 5/2009 | Mori | 296/97.4 |
| 2013/0161972 A1 | * | 6/2013 | Marcus et al. | 296/97.11 |

* cited by examiner

*Primary Examiner* — Glenn Dayoan
*Assistant Examiner* — Gregory Blankenship
(74) *Attorney, Agent, or Firm* — Price Heneveld LLP

(57) ABSTRACT

A visor is provided which pivots downwardly away from the windshield and includes a movable pivot axis that moves the visor toward the vehicle windshield and away from the operator as the operator lowers the visor. This moves the visor to a comfortable and functional position for the operator.

16 Claims, 4 Drawing Sheets

VISOR WITH MOVABLE PIVOT

CROSS-REFERENCE TO RELATED APPLICATIONS

This application claims priority under 35 U.S.C. §119(e) and the benefit of U.S. Provisional Application No. 61/578,328 entitled VISOR WITH MOVABLE PIVOT, filed on Dec. 21, 2011, by Konrad H. Marcus, et al., the entire disclosure of which is incorporated herein by reference.

BACKGROUND OF THE INVENTION

The present invention relates to vehicle visors and particularly to a visor assembly having a unique movable pivot mounting structure for attaching the visor to a vehicle.

Typically visors are mounted to a vehicle with a pivot hinge arrangement coupled to the vehicle roof near or at the A-pillar of the vehicle. When used, such visors are pivoted downwardly in a direction toward the windshield passing momentarily through the forward line of sight of the occupant as it is moved to a sun-blocking position. Also, conventional visor mounts frequently employ an auxiliary releasing clip at an end opposite the pivot connection to allow the visor to be released from the front windshield position and pivoted to a side window position. When so manipulating a visor, it sometimes becomes necessary for the occupant to duck his/her head to allow the visor to pass through the head area of the vehicle interior.

With such conventional mounting systems for vehicle visors, at least two safety issues are presented. First, the operator is momentarily distracted while manipulating the visor for use either in the front windshield position, since it passes through the line of sight, and again when it is pivoted to a side window position. Secondly, when pivoted downwardly, the visor may in some adjusted positions present an edge which projects toward the user's head. In the event of an accident, this could cause serious injury despite requirements that the edges of the visor are curved.

Newer vehicle designs have become more aerodynamic, partly to conserve fuel, and, in such designs, conventional visor mounting systems place the visors further rearwardly even closer to the occupant's head, which makes it more difficult to manipulate the visor without distracting, particularly, the vehicle operator. Some visor systems include an auxiliary visor which can be moved independently of the main windshield visor to a side window position. Movement of such auxiliary visors likewise is through the driver's head zone and can cause a significant distraction while operating a motor vehicle.

There exists a need, therefore, for a visor system which can be mounted to a vehicle in a manner which provides excellent sun-blocking properties, is easy to maneuver, eliminates some of the safety issues, and still provides features to which consumers have become accustomed, such as illuminated vanity mirrors, extendable sun-blocking or filtering panels, side window protection, and the like.

SUMMARY OF THE INVENTION

According to one embodiment of the invention, a visor is provided which pivots downwardly away from the windshield and includes a movable pivot axis that moves the visor toward the vehicle windshield and away from the operator as the operator lowers the visor. This moves the visor to a comfortable and functional position for the operator. In one embodiment, the visor also includes an extendable and retractable sun-blocking or screening glare shield. The glare shield is pivotally adjusted with respect to the primary visor and can be deployed when the primary visor is in a raised stored position or a lowered use position to provide a selectable amount of sun-blocking protection.

In another preferred embodiment of the invention, the visor includes an illuminated vanity mirror having lights to serve as a map lamp, courtesy lamp, and/or facial illuminating light source. In yet another preferred embodiment of the invention, the visor includes a covered mirror and the inside of the cover includes a magnifying mirror for assisting the user in detailed facial makeup.

Thus, with the visor system of the present invention, a unique mounting arrangement is provided in which the visors are mounted rearwardly of the windshield and pivoted downwardly away from the windshield while the pivot point moves forwardly.

These and other features, objects and advantages of the present invention will become apparent upon reading the following description thereof together with reference to the accompanying drawings.

DETAILED DESCRIPTION OF THE PREFERRED EMBODIMENT

Figure 1:
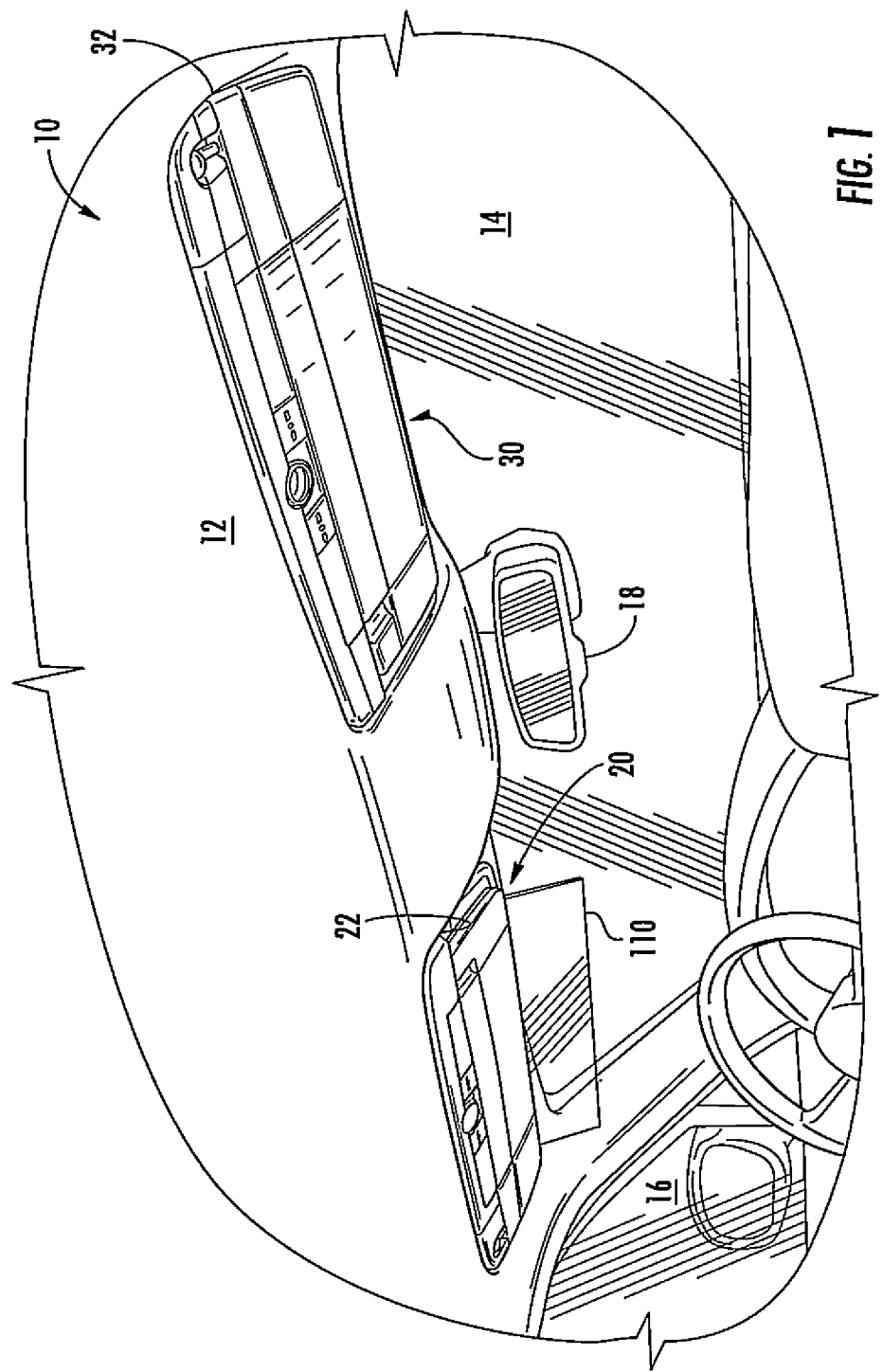
FIG. 1 is a perspective view of a vehicle including two visor assemblies embodying the present invention.
Figure 2:
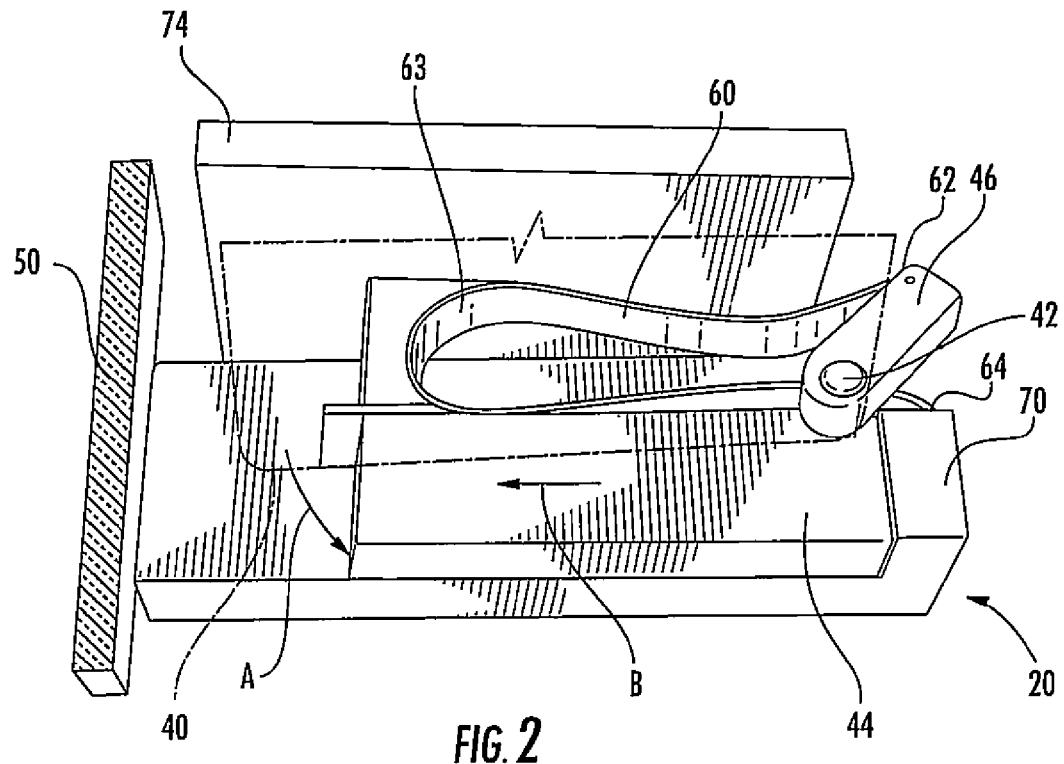
FIG. 2 is a side elevational view of the driver's side visor, shown in FIG. 1, showing the movable pivot mounting.
Figure 3:
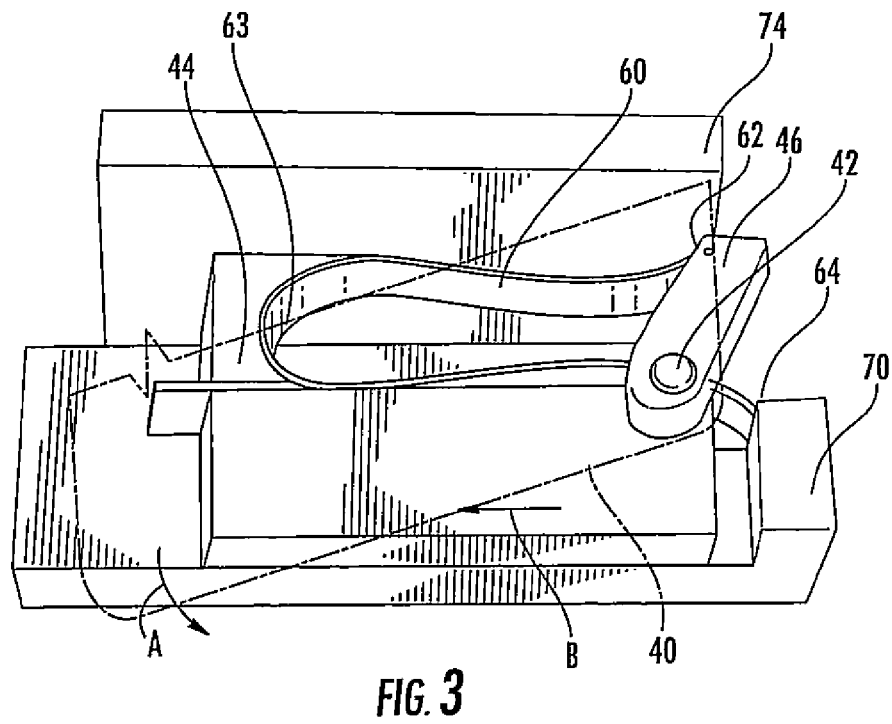
FIG. 3 is a side elevational view of the visor shown in FIG. 2, shown partially deployed.
Figure 4:
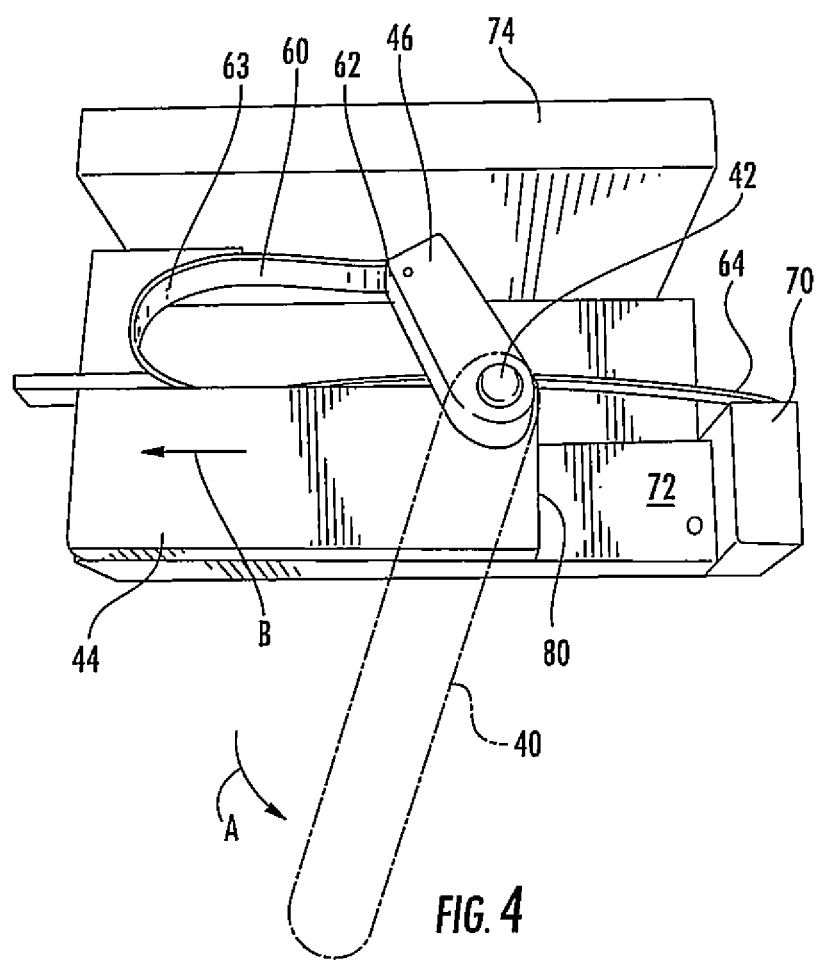
FIG. 4 is a side elevational view of the visor shown in FIG. 2, shown with the visor further deployed.
Figure 5:
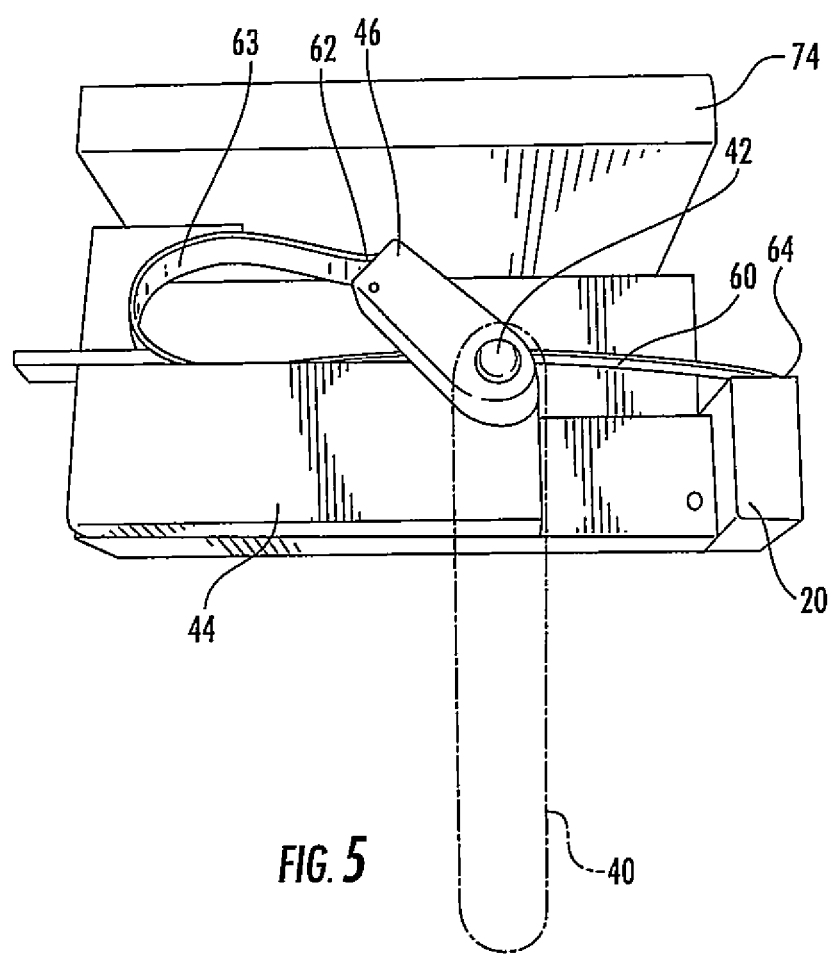
FIG. 5 is a side elevational view of the visor shown in FIG. 2, shown with the visor fully lowered and moved forwardly toward the windshield.

Referring initially to FIG. 1, there is shown a vehicle 10, such as an automobile, having a headliner 12, windshield 14, side window 16, and rearview mirror assembly 18. A pair of visor assemblies include a driver's side visor 20 and a passenger side visor 30, both of which embody the present invention. The visors 20 and 30 are mounted in recessed pockets 22 and 32 of the headliner 12 to be nestably received therein when in a stored position, as shown in FIG. 1. The visors pivot downwardly and away from the windshield.

Visors 20 and 30 are substantially identical with mirror image mounting brackets. The visors themselves are disclosed in greater detail in WO 2011/133791, published Oct. 27, 2011, the disclosure of which is incorporated herein by reference with respect to the visors themselves. The unique mounting of the visors to the roof 12 of the vehicle is described in conjunction with FIGS. 2-5 of this application. The visors 20, 30 may include a rotatable glare shield 110 which can be mounted to the visors as disclosed in U.S. patent application Ser. No. 13/530,226, filed on Jun. 22, 2012, and entitled ROTATABLE GLARE SHIELD FOR A VISOR, the disclosure of which is incorporated herein by reference. The mounting of visors 20, 30 include a movable pivot feature, which moves the visors linearly toward the windshield as they are pivoted downwardly to a use position and is described in connection with FIGS. 2-5.

Referring now to FIGS. 2-5, there is shown a visor assembly 50 (corresponding to visors 20 or 30) in which a visor body 40 is shown in phantom form for clarity in viewing the actuating mechanism. The visor blade 40 includes a cam leg 46 and is pivotally mounted at pivot point 42 to a slide 44. As the visor is lowered as indicated by arrow A in FIGS. 2 and 3, the slide moves forwardly toward the windshield 50 in the direction indicated by arrow B in FIGS. 2-4. For such purpose, the visor 40 includes an actuator extending between the visor and the vehicle. The actuator comprises a cam 46 which urges a flexible band 60 having one end 62 coupled to the end of cam 46. The opposite end 64 of band 60 is secured to a fixed roof element 70. As visor 40 is rotated downwardly in the direction indicated by arrow A, the end 62 of band 60 moves forwardly, as does the curved section 63, forcing the slide 44 and pivot point 42 forwardly as illustrated initially in FIG. 3 and shown in a midway position in FIG. 4 and finally in the visor completely lowered position in FIG. 5. The slide 44 is mounted to a fixed roof structure 70, 72 above the headliner by a slide track 80, such as a roller slide mechanism commonly employed in drawer slide mechanisms. This structure is mounted below and slides with respect to the vehicle roof 74.

The flexible band 60 in slide mechanism 80 may be replaced by a rack and pinion drive in which rotation of the visor about pivot point rotates a gear mounted to the pivot axle of the visor, which, through another gear, would engage a fixed rack in the vehicle roof above the headliner, causing the visor pivot point to move forwardly as the visor is lowered to a use position. The headliner pocket in which the visor is mounted, as seen in FIG. 1, is modified to incorporate slots for allowing the pivot axle at two spaced locations to be allowed to move from the stowed position to the forward use position shown in FIG. 5, which is approximately 2 ½ to 3 inches toward windshield 14. This moves the visor 40 more forwardly toward the windshield and away from the user's face, which is important, particularly in cars with extremely slanted windshields where the headliner junction with the windshield is close to the user's face.

It will become apparent to those skilled in the art that various modifications to the preferred embodiment of the invention as described herein can be made without departing from the spirit or scope of the invention as defined by the appended claims.

The invention claimed is:

1. A visor system for a vehicle having a headliner comprising:
    a visor body;
    a pivot mount to attach said visor body to a vehicle below the headliner for pivotal movement from a raised stored position downwardly away from the vehicle windshield and headliner to a lowered use position; and
    wherein said pivot mount for said visor body is mounted on a slide assembly, such that pivoting movement of said visor body in lowering said visor body causes said visor pivot mount to slide forwardly toward the vehicle windshield.

2. The visor system as defined in claim 1 wherein said slide assembly includes a flexible band.

3. A visor system for a vehicle comprising:
    a visor body;
    a pivot mount to attach said visor body to a vehicle for pivotal movement from a raised stored position downwardly away from the vehicle windshield to a lowered use position;
    wherein said pivot mount for said visor body is mounted on a slide assembly, which includes a flexible band and wherein said visor includes a cam coupled to one end of said flexible band, such that, as said visor body is lowered, the visor and pivot mount slide forwardly, toward the vehicle windshield; and
    wherein said visor includes a cam coupled to one end of said flexible band.

4. The visor system as defined in claim 3 wherein said cam is on a side of said pivot mount opposite said visor body.

5. The visor system as defined in claim 4 wherein said flexible band has an opposite end fixedly coupled to said vehicle.

6. The visor system as defined in claim 5 wherein said slide assembly includes a slide track and guide.

7. A visor system for a vehicle comprises:
    a visor body and a pivot mount to attach said visor body to a vehicle for pivotal movement from a raised stored position downwardly away from the vehicle windshield to a lowered use position; and
    wherein said pivot mount for said visor body is mounted on a slide coupled to the vehicle with an actuator extending between said visor and said vehicle, wherein said actuator includes a flexible band and wherein said visor includes a cam coupled to one end of said flexible band, such that, as said visor body is lowered, the visor and pivot mount slide forwardly toward the vehicle windshield.

8. The visor system as defined in claim 7 wherein said cam is on a side of said pivot mount opposite said visor body.

9. The visor system as defined in claim 8 wherein said flexible band has an opposite end fixedly coupled to said vehicle.

10. The visor system as defined in claim 9 wherein said slide assembly includes a slide track and guide.

11. A visor system for a vehicle having a headliner comprising:
    a visor body;
    a pivot mount to attach said visor body to a vehicle below the headliner for pivotal movement from a raised stored position downwardly away from the vehicle windshield and headliner to a lowered use position;
    wherein said pivot mount for said visor body is mounted on a slide assembly, such that the pivoting movement of said visor body in lowering said visor body causes said visor pivot mount to slide forwardly toward the vehicle windshield; and
    a glare shield rotatably mounted to said visor for movement between stored and use positions.

12. The visor system as defined in claim 11 wherein said slide assembly includes a flexible band.

13. A visor system for a vehicle comprising:
    a visor body;
    a pivot mount to attach said visor body to a vehicle for pivotal movement from a raised stored position downwardly away from the vehicle windshield to a lowered use position;
    wherein said pivot mount for said visor body is mounted on a slide assembly, wherein said slide assembly includes a flexible band and wherein said visor includes a cam coupled to one end of said flexible band, such that, as said visor body is lowered, the visor and pivot mount slide forwardly toward the vehicle windshield; and
    a glare shield rotatably mounted to said visor for movement between stored and use positions.

14. The visor system as defined in claim 13 wherein said cam is on a side of said pivot mount opposite said visor body.

15. The visor system as defined in claim 14 wherein said flexible band has an opposite end fixedly coupled to said vehicle.

16. The visor system as defined in claim 15 wherein said slide assembly includes a slide track and guide.

\* \* \* \* \*